United States Patent
Boyd

(10) Patent No.: US 7,158,268 B2
(45) Date of Patent: *Jan. 2, 2007

(54) DIGITAL IMAGE SCANNER WITH A VARIABLE APERTURE LENS AND MULTIPLE SCANNING SPEEDS

(75) Inventor: David W Boyd, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 349 days.

This patent is subject to a terminal disclaimer.

(21) Appl. No.: 10/624,245

(22) Filed: Jul. 21, 2003

(65) Prior Publication Data

US 2004/0017591 A1    Jan. 29, 2004

Related U.S. Application Data

(63) Continuation of application No. 09/614,579, filed on Jul. 12, 2000, now Pat. No. 6,621,600, which is a continuation-in-part of application No. 09/257,459, filed on Feb. 25, 1999, now abandoned.

(51) Int. Cl.
*H04N 1/04* (2006.01)

(52) U.S. Cl. .................. 358/474; 358/471; 348/203

(58) Field of Classification Search ................ 358/474, 358/471; 348/203, 167, 254, 266; 367/138, 367/105, 11
See application file for complete search history.

(56) References Cited

U.S. PATENT DOCUMENTS

| 4,345,270 | A | * | 8/1982 | Nagumo et al. ............ 348/266 |
| 5,301,168 | A | * | 4/1994 | Miller ......................... 367/138 |
| 6,621,600 | B1 | * | 9/2003 | Boyd et al. ................. 358/474 |

\* cited by examiner

*Primary Examiner*—Thomas D Lee
*Assistant Examiner*—Heather D Gibbs
(74) *Attorney, Agent, or Firm*—Augustus W. Winfield

(57) ABSTRACT

A scanner is provided with a variable aperture lens system. High resolution scans use a relatively small aperture size, and scanning speed is relatively slow. Low resolution scans use a relatively large aperture size, and scanning speed is increased. Fast scans are limited to lower sampling rates, which in turn permit more optical blurring relative to high sampling rates. Accordingly, the incremental cost of the larger aperture is minimized by permitting the lens aberrations specifications to be relaxed at larger apertures. Preferably, an electronic variable aperture is provided, for example, by use of electronically controlled polarization plates or by use of electrochromic substances.

3 Claims, 3 Drawing Sheets

DIGITAL IMAGE SCANNER WITH A VARIABLE APERTURE LENS AND MULTIPLE SCANNING SPEEDS

CROSS-REFERENCE TO RELATED APPLICATIONS

The present application is a continuation of U.S. application Ser. No. 09/614,579 (filed Jul. 12, 2000) now U.S. Pat. No. 6,621,600, which is a continuation-in-part of Ser. No. 09/257,459 (filed Feb. 25, 1999, abandoned). Application Ser. Nos. 09/614,579 and 09/257,459 are hereby incorporated herein by reference.

FIELD OF INVENTION

This invention relates generally to digital image scanners, copiers, and facsimile machines and more specifically to system in which speed and sampling rate are interrelated through use of a variable aperture lens.

BACKGROUND OF THE INVENTION

Image scanners convert a visible image on a document or photograph, or an image in a transparent medium, into an electronic form suitable for copying, storing or processing by a computer. An image scanner may be a separate device or an image scanner may be a part of a copier, part of a facsimile machine, or part of a multipurpose device. Reflective image scanners typically have a controlled source of light, and light is reflected off the surface of a document, through an optics system, and onto an array of photosensitive devices. The photosensitive devices convert received light intensity into an electronic signal. Transparency image scanners pass light through a transparent image, for example a photographic positive slide, through an optics system, and then onto an array of photosensitive devices.

In general, image scanners use an optical lens system to focus an image onto an array of photosensors. Photosensor arrays typically have thousands of individual photosensitive elements. Each photosensitive element, in conjunction with the scanner optics system, measures light intensity from an effective area on the document defining a picture element (pixel) on the image being scanned. Optical sampling rate is often expressed as pixels per inch (or mm) as measured on the image being scanned. For opaque images, for example, photographs or printed pages, a typical scanner optical sampling rate is 600 pixels per inch (24 pixels per mm).

One important specification for scanning is the overall time required to scan an image. One important factor is the data transfer rate between the scanner and a host computer. High sampling rates generate large quantities of data, and at high sampling rates the data transfer rate may limit overall scanning time. Another important factor that can affect the overall time required to scan an image is the sensor exposure time. Typically, in a photosensor circuit, current generated by light is used to change the charge on a capacitor. A finite time is required to change the charge on a capacitor sufficiently to ensure an acceptable signal to noise ratio. At lower sampling rates, sensor exposure time may limit the overall time required to scan an image. The required sensor exposure time may be reduced by increasing the intensity of illumination on the document, or by increasing the aperture size of the optics system (thereby capturing more of the light reflected from the document). Either approach adds cost. In particular, the cost of a lens system increases substantially with aperture size, partly because controlling lens aberrations becomes more difficult and expensive as the lens aperture size increases. There is a need for reducing exposure time in a digital image scanner without substantially increasing cost.

SUMMARY OF THE INVENTION

In a scanner in accordance with the invention, a variable aperture lens system is provided. For high sampling rate scans, where overall scan time may be limited by data transfer rate, a relatively small aperture size is used. A small aperture size minimizes lens aberrations. However, a small aperture size reduces the light captured for the sensor array, and as a result, the exposure times are relatively long. For low sampling rates, where sensor exposure time may limit scanning time, a relatively large aperture size is used. With a larger aperture size, sensor exposure time is reduced, and scanning speed may be increased until some other factor, such as data transfer rate, limits overall scanning time. Fast scans are limited to lower sampling rates, which in turn permit more optical blurring relative to high sampling rates. Accordingly, the lens aberrations specifications are relaxed at larger apertures to minimize the incremental cost of the larger aperture. The invention enables higher scanning speeds in a mode in which the scanner can take advantage of higher scanning speeds. That is, in a mode in which data transfer rate is not the limiting factor (low resolution), the invention enables faster scanning. The variable aperture may be mechanical, electromechanical, or electronic (for example, by using an electronically controlled polarization plate, or electrochromic substances).

DETAILED DESCRIPTION OF THE PREFERRED EMBODIMENT OF THE INVENTION

Figure 1:
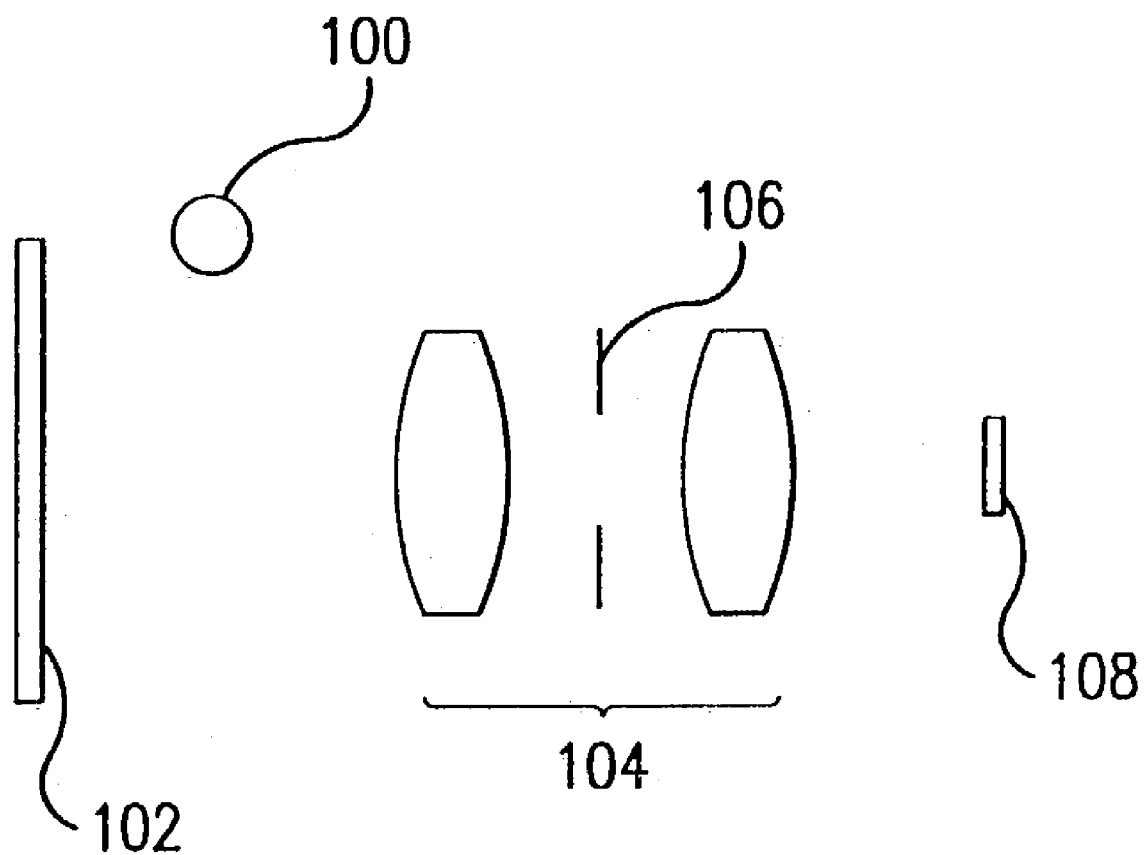
FIG. 1 is a block diagram side view of an image scanner in accordance with the invention.

FIG. 1 illustrates a simplified image scanner. A lamp 100 illuminates a document 102. Light reflected from the document 102 passes through a lens system 104 and is focused onto a sensor array 108. The lens system 104 includes a variable aperture element (for example, an iris diaphragm) 106. The image scanner has a processor based controller (not illustrated) and the aperture size of the iris 106 is controllable by the controller. Typically, image scanning lens systems have multiple elements. Lens systems for image scanning typically do not include a variable aperture element. Image scanners typically have other optical system design considerations that are not relevant to the present patent document. For example, image scanners may have folded optical paths, and color image scanners have color separation devices (for example, filters or beam splitters).

Sampling rate is the number of samples, in pixels per inch (or pixels per mm), that are created by a scanner, per linear distance. Optical sampling rate is the sampling rate defined by the optical magnification and the pitch of the sensor array. Sampling rates other than the optical sampling rate are obtained by interpolation of pixel data, or by decimation of pixel data. Resolution is the degree to which the scanner distinguishes detail in an object; it is affected by sampling rate, but also by other aspects of a scanner such as optics quality, mechanical stability, temperature, humidity, electronic bandwidth, and image processing. Modulation transfer function is a measure of a scanner's optical frequency response with scanning line pairs having a spatial frequency that is within the limits of the scanner. For further discussion of scanning optical parameters, see Robert G. Gann, *Desktop Scanners: Image Quality Evaluation*, Prentice Hall, 1998.

In an image scanning system in accordance with the invention, a relatively small lens aperture is used when relatively high sampling rates are requested, or when relatively slow scanning speed is selected. A relatively large lens aperture is used when relatively low sampling rates are requested, or when a relatively fast scanning speed is requested. Given a specified modulation transfer function of an image scanning system, the lens system must be designed so that the contribution of the optical aberrations are sufficiently small to enable the specified modulation transfer function. In the present invention, however, large apertures are used only for low sampling rates, and low sampling rates permit a reduced spatial bandwidth for the modulation transfer function. Therefore, the specifications for aberrations for the lens system are relaxed for large apertures. As a result, faster scans can be performed (the larger aperture captures more light, thereby decreasing the time required to change the charge on photosensor capacitances), without requiring a large increase in the cost of the lens system.

The variable aperture element 106 may be mechanical. That is, a scanner user could manually select an aperture just as aperture is manually selected on many camera lenses. Alternatively, the variable aperture element could be electromechanical, with the controller selecting an aperture. Again, the camera industry provides numerous examples of electromechanical apertures.

Preferably, for highest reliability, the variable aperture element 106 is electronic, with no moving parts. One example embodiment of an electronic aperture is to use polarizing optics. For example, two polarization layers or plates may be used in conjunction with an electronically controllable phase retarder. A first polarization plate or layer, transmitting light primarily of a singular polarization, may be placed anywhere in the optical path. The phase retarder, placed between the two polarization plates or layers, may be electronically controlled to either transmit light with no change, or to retard the phase of transmitted light by ninety degrees. A second polarization plate or layer may have an annular ring that transmits light primarily of the same singular polarization as the first polarization plate or layer. The inner diameter of the annular ring defines the smaller aperture, and the outer diameter of the annular ring defines the larger aperture. When the phase retarder is controlled to transmit light with no change, the two polarization plates transmit light of one polarization. However, if phase retarder retards the phase of transmitted polarized light by ninety degrees, then most of the light cannot pass through both the first polarization plate and the polarized annular ring of the second polarization plate. One commercially available example of an electronically controlled retarder is a liquid crystal variable retarder available from Meadowlark Optics, P.O. Box 1000, 5964 Iris Parkway, Frederick, Colo., 80530. Another example is a ferroelectric liquid crystal cell, available from Displaytech, Inc., 2602 Clover Basin Drive, Longmont, Colo., 80503.

An alternative embodiment for a electronic aperture is to use electrochromic substances. Electrochromic substances change their transmittance to light in response to a variation of electrical current, voltage, or magnetic field. These substances may be implemented as a separate iris element as illustrated in FIG. 1 (some electrochromic devices are implemented as a liquid or gel between transparent electrodes), or may be implemented as a film used to directly coat the outer area of a lens surface. There are many electrochromic substances described in the optics literature. Two specific examples of electrochromic substances being used for electronic apertures for lens systems may be found in U.S. Pat. Nos. 4,526,454 and 5,471,339. In each of the cited patents, an electronic diaphragm is described that is capable of having more than two selectable apertures for light transmittance. While a multiple aperture device could provide many choices for speed in an image scanner, it may be suitable in an image scanner to simply provide a choice of two apertures for light transmittance. That is, the aperture, whether polarizing or electrochromic, may have a transparent inner area surrounded by an electronically controlled annular or ring shaped area.

Figure 2:
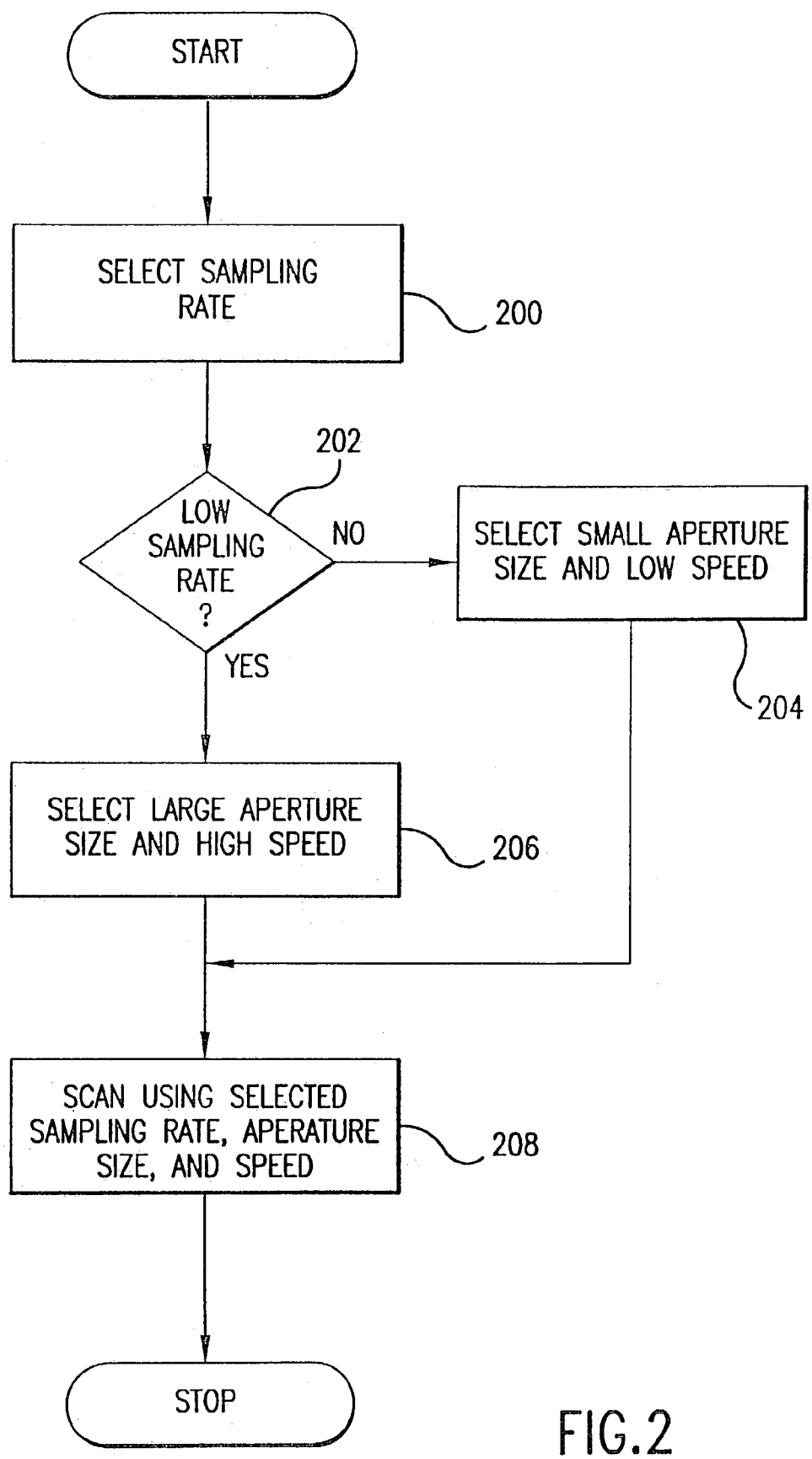
FIG. 2 is flow chart of a method in accordance with the invention.

FIG. 2 is a flow chart illustrating a method in accordance with the invention. At step 200, an operator selects a sampling rate. If a low sampling rate is selected (test 202), the iris is set to a large aperture size and the scanning speed is set to a high speed (step 206). If a high sampling rate is selected, the iris is set to a small aperture size, and the scanning speed is set to a low speed. The document or other image is then scanned using the selected sampling rate, aperture size, and speed (step 208).

Figure 3:
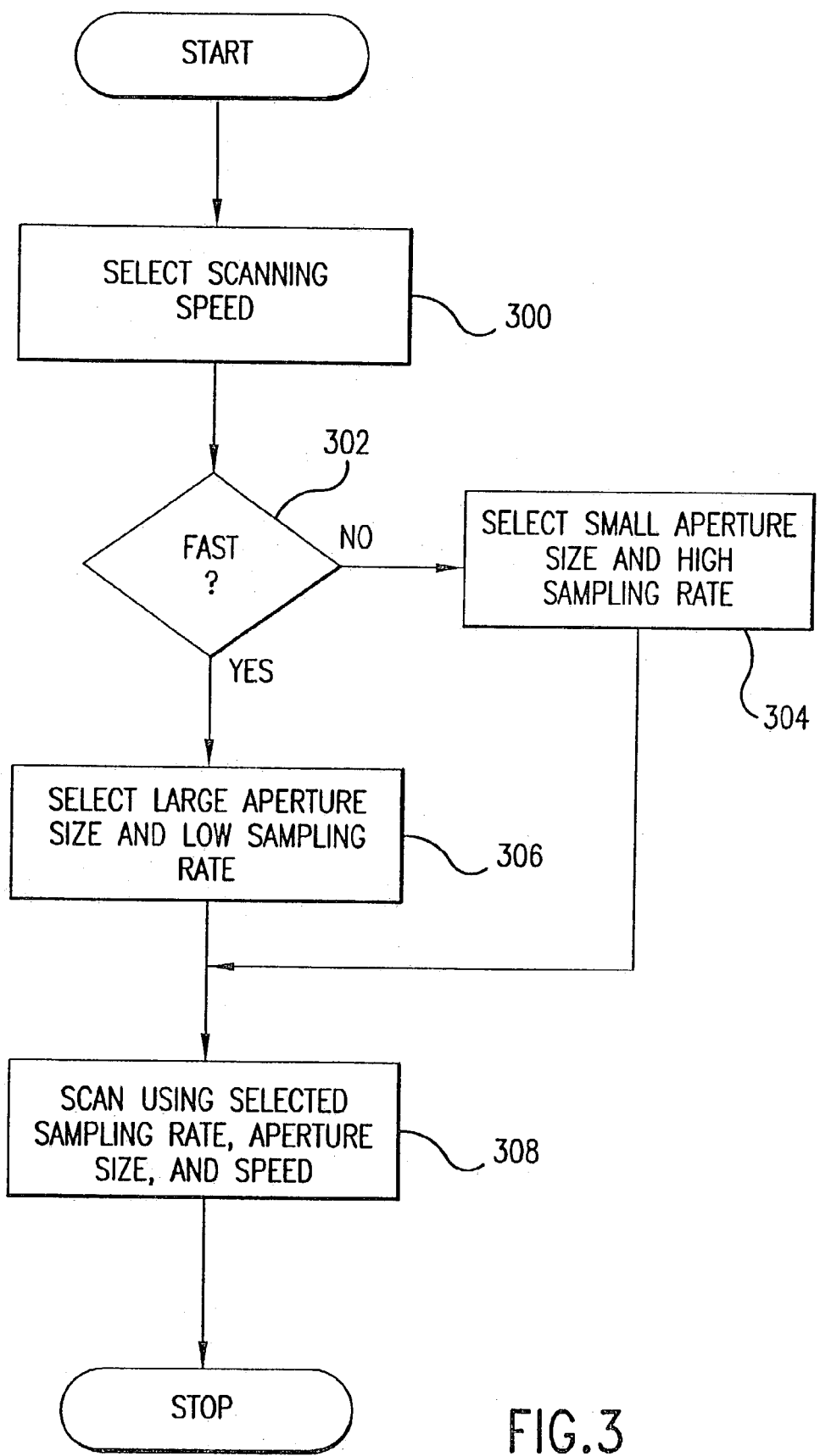
FIG. 3 is flow chart of an alternative method in accordance with the invention.

FIG. 3 is a flow chart illustrating an alternative method in accordance with the invention. At step 300, an operator selects a scanning speed. If a high speed is selected (test 302), the iris is set to a large aperture size and the sampling rate is limited to a relatively low rate (step 306). If a low speed is selected, the iris is set to a small aperture and the sampling rate is not limited (step 304). The document or other image is then scanned using the selected sampling rate, aperture size, and speed (step 308).

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An optical image scanner comprising:
   a lens system;
   an iris within the lens system, the iris having at least a first aperture size and a second aperture size, the second aperture size being larger than the first aperture size; and
   the iris set to the first aperture size when scanning at a first speed and the iris set to the second aperture size when scanning at a second speed, the second speed faster than the first speed.

2. The optical image scanner of claim 1, further comprising:
   the lens system having sufficiently low aberrations at the first aperture size to enable a specified modulation transfer function; and the lens system having aberrations at the second aperture size such that a resulting modulation transfer function is worse than the specified modulation transfer function.

3. A method far scanning comprising:

selecting a first scanning speed or a second scanning speed, the second scanning speed being faster than the first scanning speed;

scanning using a first aperture size when the scanning speed is the first scanning speed;

scanning using a second aperture size when the scanning speed is the second scanning speed, the first aperture size being smaller than the second aperture size.

* * * * *

UNITED STATES PATENT AND TRADEMARK OFFICE
CERTIFICATE OF CORRECTION

PATENT NO. : 7,158,268 B2  
APPLICATION NO. : 10/624245  
DATED : January 2, 2007  
INVENTOR(S) : David W Boyd Page 1 of 1

It is certified that error appears in the above-identified patent and that said Letters Patent is hereby corrected as shown below:

In column 5, line 5, in Claim 3, delete "far" and insert -- for --, therefor.

Signed and Sealed this

Fifth Day of May, 2009

JOHN DOLL  
*Acting Director of the United States Patent and Trademark Office*